United States Patent [19]

Degnan

[11] Patent Number: 5,262,901
[45] Date of Patent: Nov. 16, 1993

[54] DOOR VIEWER

[75] Inventor: Donald E. Degnan, New York, N.Y.

[73] Assignee: Rudolph-Desco Company, Inc., Englewood Cliffs, N.J.

[21] Appl. No.: 845,621

[22] Filed: Mar. 10, 1992

[51] Int. Cl.⁵ .............................................. G02B 25/04
[52] U.S. Cl. ................................. 359/819; 359/503; 359/504; 359/802
[58] Field of Search ............... 359/503, 504, 744, 894, 359/367, 798–802, 809–811, 821

[56] References Cited

U.S. PATENT DOCUMENTS

| | | | |
|---|---|---|---|
| 3,973,835 | 8/1976 | Miyakawa et al. | 359/504 |
| 4,050,792 | 9/1977 | Svensson | 359/504 |
| 4,964,711 | 10/1990 | Degnan | 359/503 |

Primary Examiner—Bruce Y. Arnold
Assistant Examiner—James Phan
Attorney, Agent, or Firm—Hedman, Gibson & Costigan

[57] ABSTRACT

A viewing device for installation on a wall or door includes a housing projecting from the front surface of the door and defining a plurality of surveillance ports disposed axially, and non-axially relative to the axis of the housing. By means of a knob extending outwardly from the rear door surface and defining a viewing port axially aligned with the axial surveillance port, the user is able to move a mirror between a first orientation intersecting the housing axis at an acute angle and a second orientation parallel to and spaced from the housing axis. Rotation of the knob relative to the housing causes rotation and pivoting of the mirror so that, when the mirror is in the first orientation, a line of sight is defined at different times from the viewing port through each of the non-axial surveillance ports via the mirror and, when the mirror is in the second orientation, a line of sight is defined from the viewing port directly through the axial surveillance port.

23 Claims, 9 Drawing Sheets

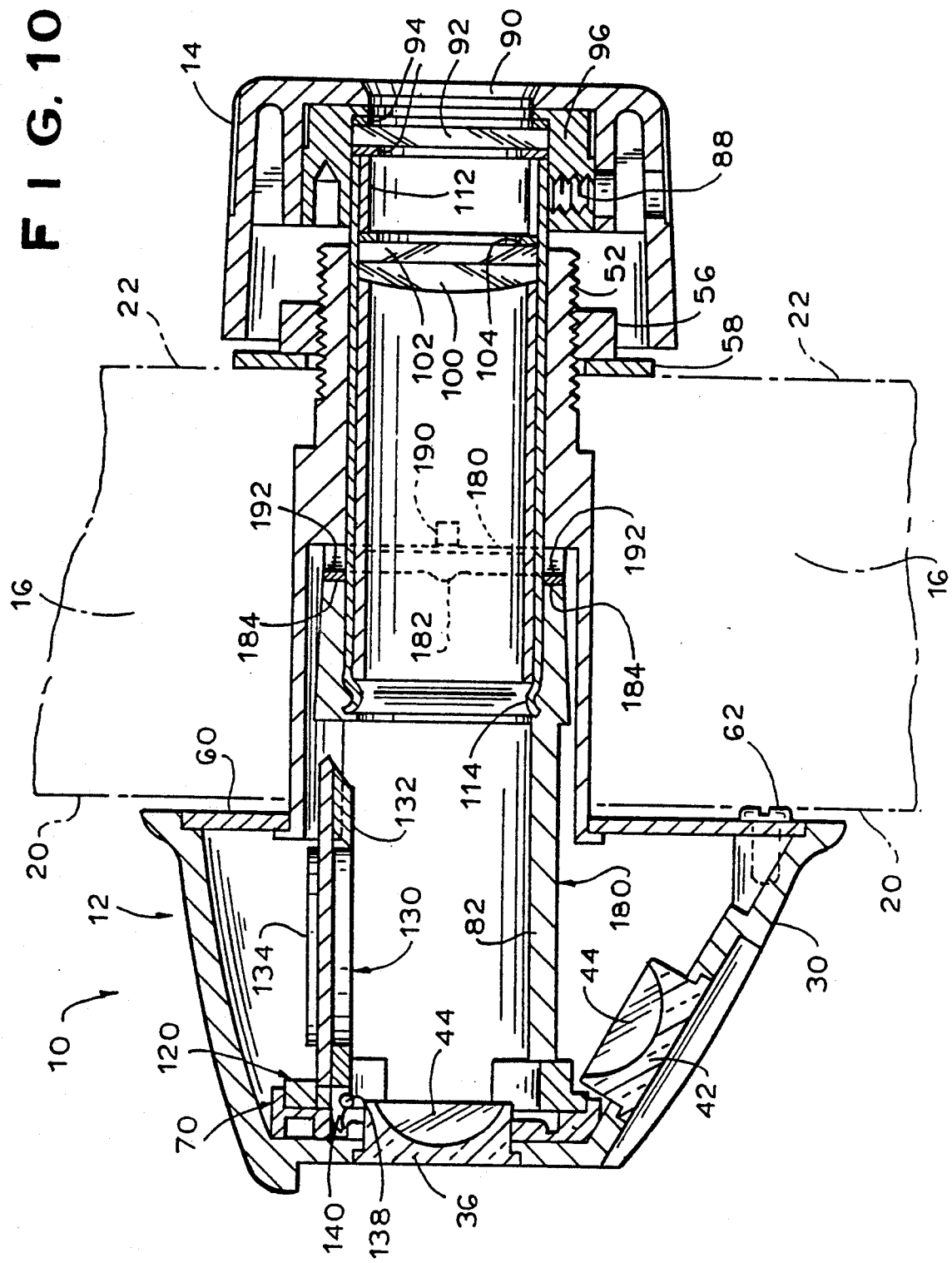

DOOR VIEWER

BACKGROUND OF THE INVENTION

The present invention relates to a viewing device for installation on a door, and more particularly to such a device which permits at various times viewing straight ahead, laterally to both sides, and downwardly.

The problem of home security is well documented. Throughout history, the greatest problem has been simply to identify a caller seeking admission to a house or other dwelling. People have employed many devices to augment their ability to identify a caller. For centuries peepholes of one sort or another have assisted in identifying potential entrants. The traditional peephole has been refined over the years to include the use of ultra-wide angle "fish-eye" lenses to enhance the field of view and camouflage, like one-way glass, to conceal the observer within.

Generally multi-family dwellings and in particular the urban apartment house present special problems. For example, ambient hallway lighting may be inadequate, and irregularly-shaped hallways make ideal hiding places for persons seeking to avoid detection.

There have been several attempts at evolving a device to obtain a wider and clearer viewing field. However, devices in accordance with the prior art have a multiplicity of problems, including one or more of the following: reduced viewing acuity, a pronounced lack of reliability, liability to tampering, and encouraging the spread of fire.

U.S. Pat. No. 3,973,835 issued to Miyakawa et al. discloses a periscope device which includes a fixed one-way or see-through mirror. The viewer looks through the one-way mirror to achieve an axial view, and by appropriately positioning the mirror accomplishes radial viewing. However, the mirror acts as a filter and decreases the amount of available light reaching the eyepiece during axial viewing.

U.S. Pat. No. 4,050,792 discloses a viewing device which is comprised of a housing and three separate viewing elements which afford a panoramic view. The field of view is inherently limited by the placement of the individual viewing elements, making right-angle viewing unobtainable. Moreover, the separate viewing elements require the viewer to align his line of sight through three separate apertures. Finally, the construction of the device would encourage the spread of fire as the mounting hole, cut through the door, could act as a sizable chimney drawing flames therethrough.

U.S. Pat. No. 4,964,711 issued to Degnan discloses a viewing device which includes a swingingly fixed mirror having an opaque reflecting surface which aligns with a plurality of surveillance ports. By turning the eyepiece, the viewer swings the mirror into position in front of the surveillance port to be accessed to achieve radial viewing, and by further turning of the eyepiece withdraws the mirror from an axial line of sight so that axial viewing is achieved. However, because the effecting of a line of sight between the view port on one side of the door and a surveillance port on the other side of the door, whether directly or via the mirror, is not made manifest to the viewer (except visually), the viewer is frequently confused and cannot determine when the intended line of sight has been achieved where the visual indication is not readily perceptible (for example, where the hall lighting is very dim). While there may be an indication on the eyepiece to enable the viewer to determine when a line of sight has been achieved (and even which line of sight has been achieved), such a visual indication on the eyepiece is, of course, of no use to the viewer who has his eye pressed against the viewing port within the eyepiece and hence cannot see the markings on the eyepiece.

Accordingly, it is an object of the present invention to provide a viewing device affording a high level of viewing acuity along all pertinent lines of sight.

Another object is to provide such a viewing device wherein all pertinent lines of sight afford generally equal viewing acuity.

A further object is to provide such a device which acts as a fire barrier.

It is also an object of the present invention to provide in a preferred embodiment such a device which communicates in a non-visual manner with the viewer, to indicate when one of the possible lines of sight has been achieved.

It is another object to provide such a device which is characterized by a high level of reliability and a high resistance to tampering.

It is a further object to provide such a device which is simple and easy to manufacture, use and maintain.

SUMMARY OF THE INVENTION

The above and related objects of the present invention are obtained in a viewing device for installation on a door or wall. The device comprises a hollow axially-extending housing for non-rotatable installation through a door, the housing having a front portion adapted to project outwardly from a front surface of the door and a rear portion extending through the door and projecting outwardly from an opposed rear surface of the door. The front portion defines a camming surface and a plurality of surveillance ports disposed axially, and non-axially to both sides, and downwardly relative to the axis of the housing. A hollow axially-extending inner tube rotatable relative to the housing defines a front portion and a rear portion. The tube front portion is disposed at least partially within the housing front portion, and the tube rear portion projects outwardly from the door rear surface. A hollow rotatable knob is adapted to extend outwardly from the door rear surface and is releasably secured to the tube rear portion for rotation therewith. The knob defines a viewing port axially aligned with the axial surveillance port. A mirror assembly is disposed in the inner tube for rotation therewith and including a mirror movable between a first orientation intersecting the inner tube axis at an acute angle and a second orientation parallel to and spaced from the inner tube axis. The mirror assembly defines a curved cam follower cooperatively engaging the camming surface such that rotation of the knob relative to the housing causes rotation and pivoting of the mirror so that, when the mirror is in the first orientation, a line of sight is defined at different times from the viewing port through each of the lateral and downward surveillance ports via the mirror and, when the mirror is in the second orientation, a line of sight is defined from the viewing port directly through the axial surveillance port.

In a preferred embodiment, rotation of the knob causes rotation of the mirror to define at different times lines of sight from the viewing port successively via the mirror through each of the lateral and downward surveillance ports, and rotation of the knob at one point causes pivoting of the mirror out of the line of sight from the viewing port directly through the axial surveillance port. The tube front end portion is generally U-shaped and defines an open side to enable a line of sight from the viewing port via the mirror through one of the lateral and downward surveillance ports, the mirror being pivotable upwardly toward the open side of the tube front portion to enable a line of sight from the viewing port directly through the axial surveillance port. The camming surface defines a 360° groove, which preferably is round for about 180° (i.e, semicircular) and elliptical for about 180° (i.e., semi-elliptical). Typically, the mirror is opaque and disposed an angle of about 20–40° relative to the longitudinal axis of the inner tube when disposed in the line of sight from the viewing port through one of the lateral and downward surveillance ports.

In an especially preferred embodiment, the housing and the inner tube define snap-action means for indicating to the user the effecting of a line of sight between the viewing port and one (preferably each) of the surveillance ports. More particularly, a wave washer defining at least one wave is secured to the housing, and the inner tube defines a plurality of circumferentially spaced indentations adapted to receive the wave of the wave washer when a line of sight is effected from the viewing port through one of the surveillance ports. The wave washer is non-rotatably secured to the housing rear portion, and the plurality of circumferentially spaced indentations are equidistantly spaced apart.

To prevent fire spreading, the housing rear portion is made of metal, the inner tube rear portion is made of metal, and a lens made of pyrex is disposed within the tube rear portion, whereby the housing rear portion, tube rear portion and pyrex lens define a fire barrier within the device. The housing and tube front portions are typically plastic.

A wide angle lens is disposed in each of the surveillance ports, and a magnifying lens is disposed in the inner tube in the lines of sight between the viewing port and the surveillance ports.

BRIEF DESCRIPTION OF THE DRAWING

The above brief description, as well as further objects, features and advantages of the present invention, will be more fully understood by reference to the following detailed description of the presently preferred, albeit illustrative, embodiments of the present invention when taken in conjunction with the accompanying drawing wherein:

FIG. 7A is a front view of the cam element;

FIG. 10 is a sectional elevational view thereof, similar to FIG. 2 but after rotation of the knob by 180°.

DETAILED DESCRIPTION OF THE PREFERRED EMBODIMENTS

Figure 1:
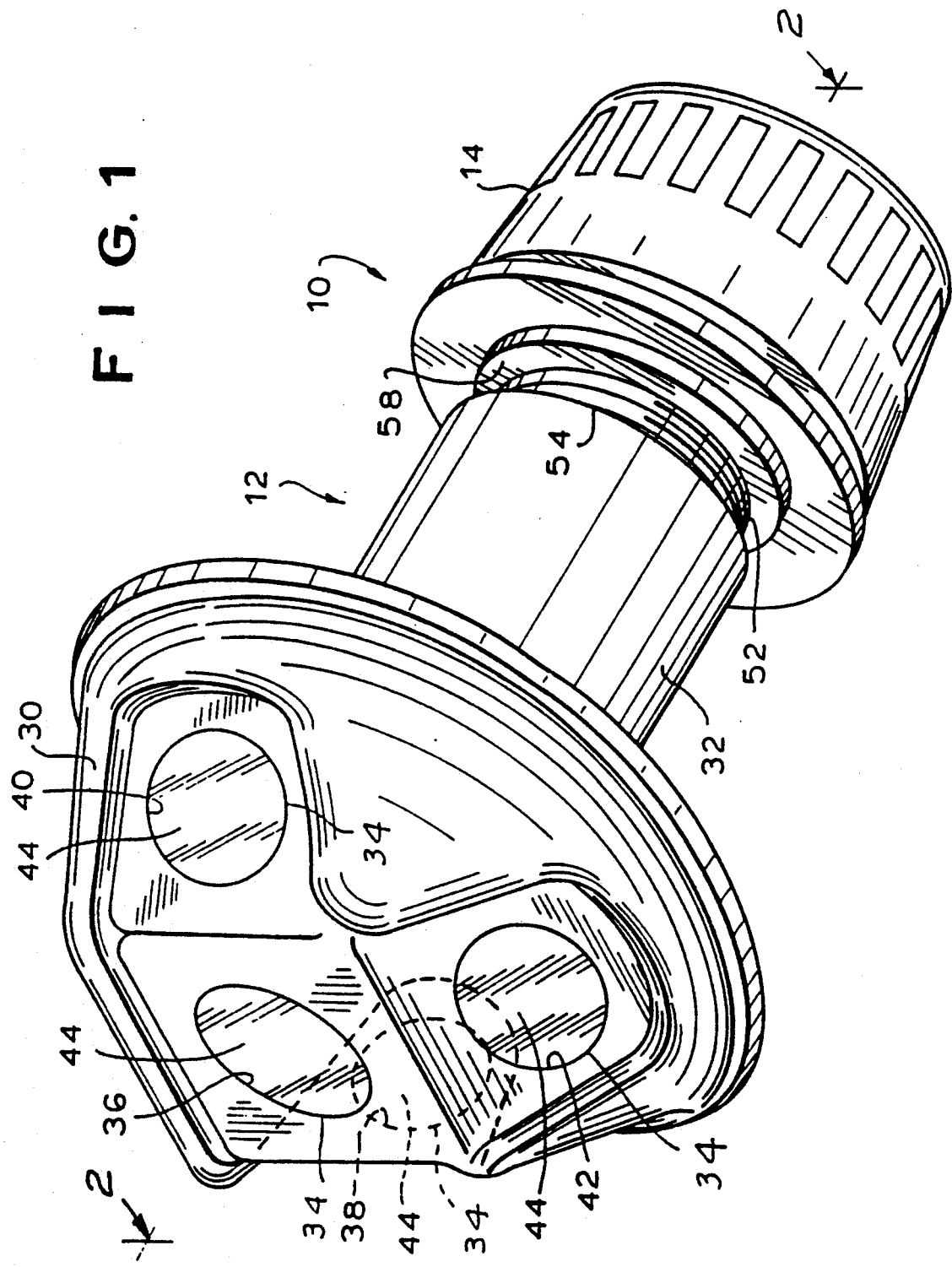
FIG. 1 is an isometric view of a viewing device according to the present invention.

Referring now to the drawing, and in particular to FIG. 1 thereof, therein illustrated is a viewing device according to the present invention, generally designated by the reference numeral 10. From the exterior, the viewing device 10 is comprised basically of an axially extending housing generally designated 12 and a rotatable knob 14.

Figure 2:
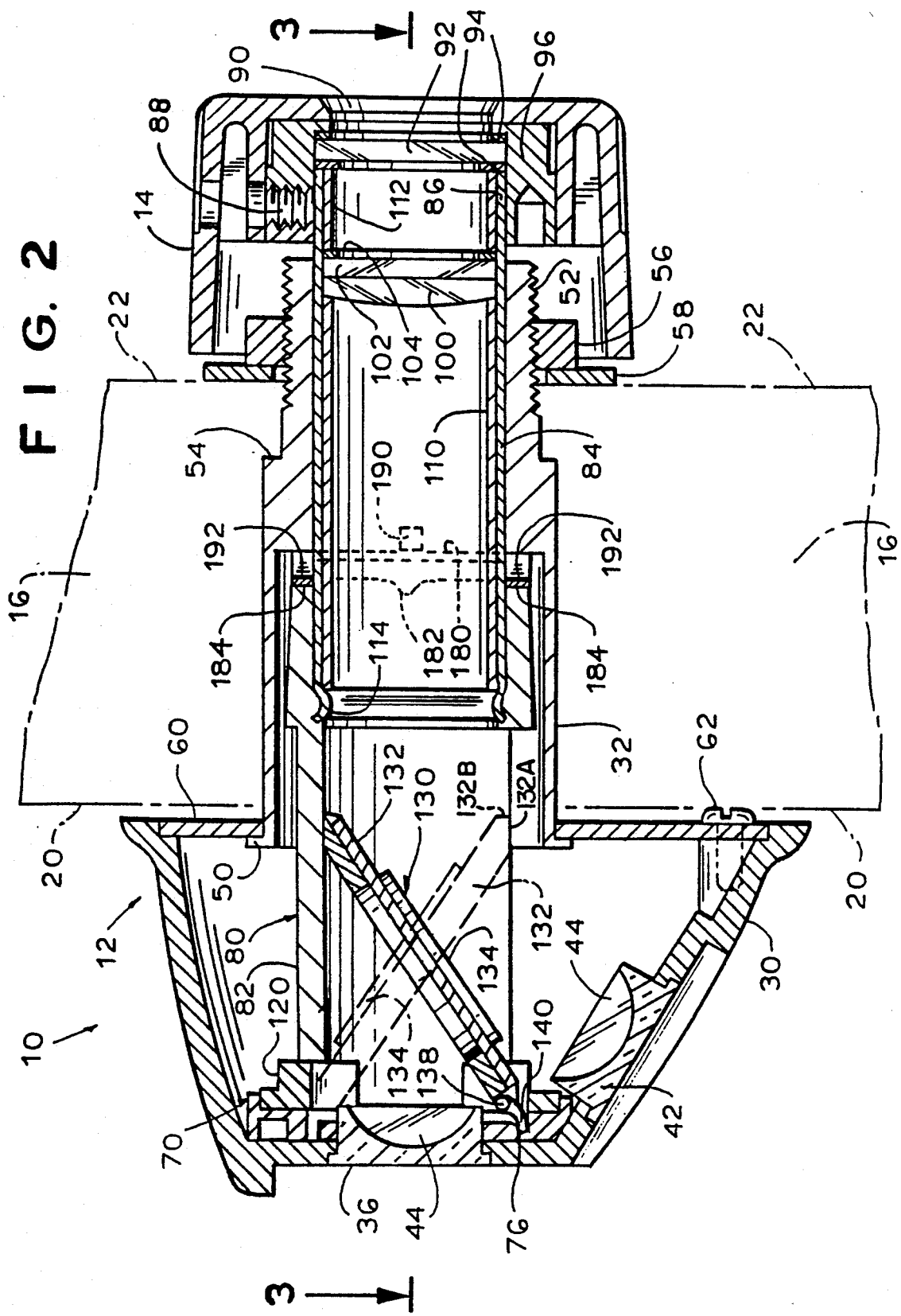
FIG. 2 is a sectional elevational view thereof taken along the line 2—2 of FIG. 1.
Figure 3:
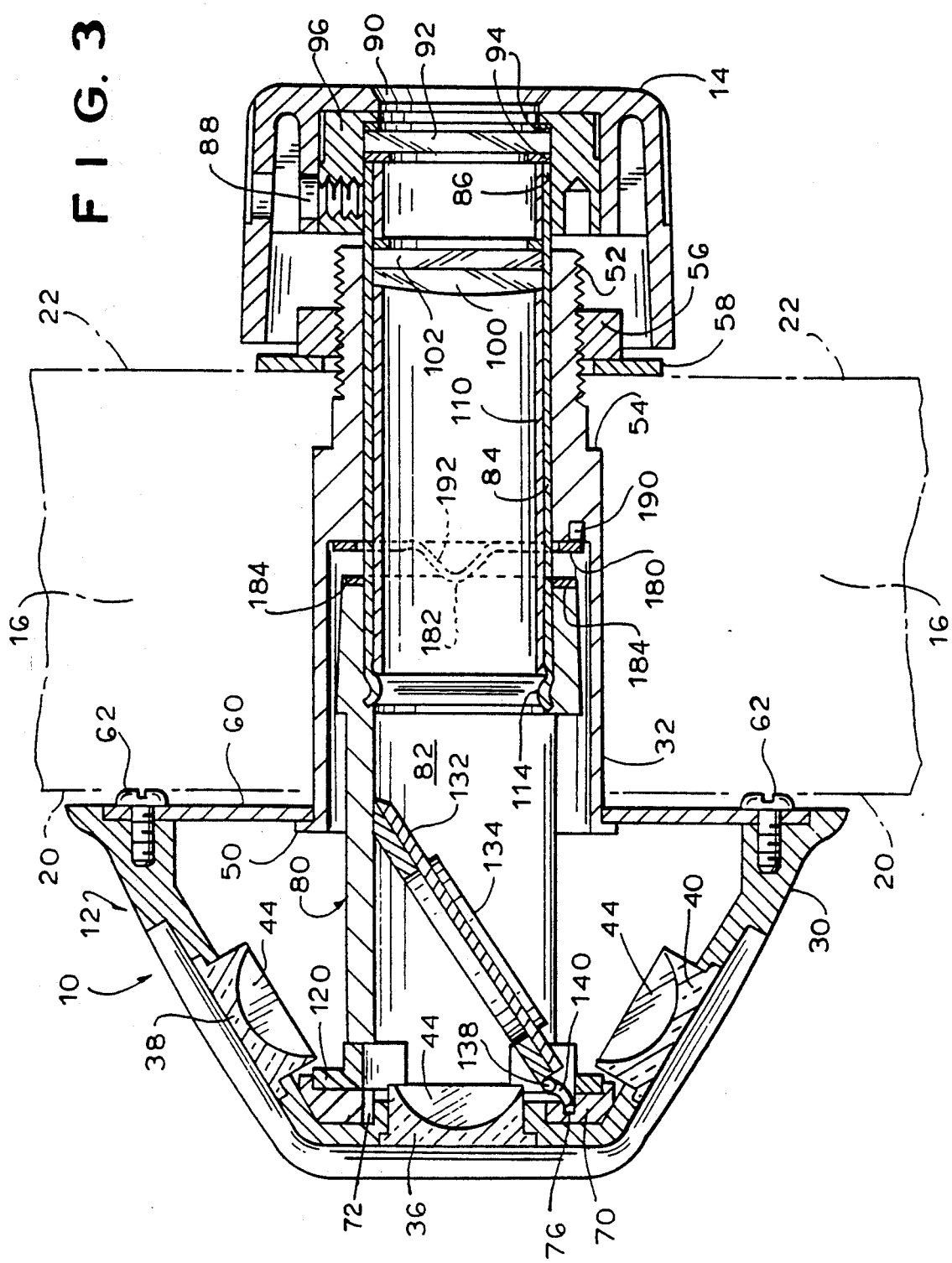
FIG. 3 is a sectional plan view thereof, at right angles to the sectional view of FIG. 2, taken along the line 3—3 of FIG. 2.
Figure 4:
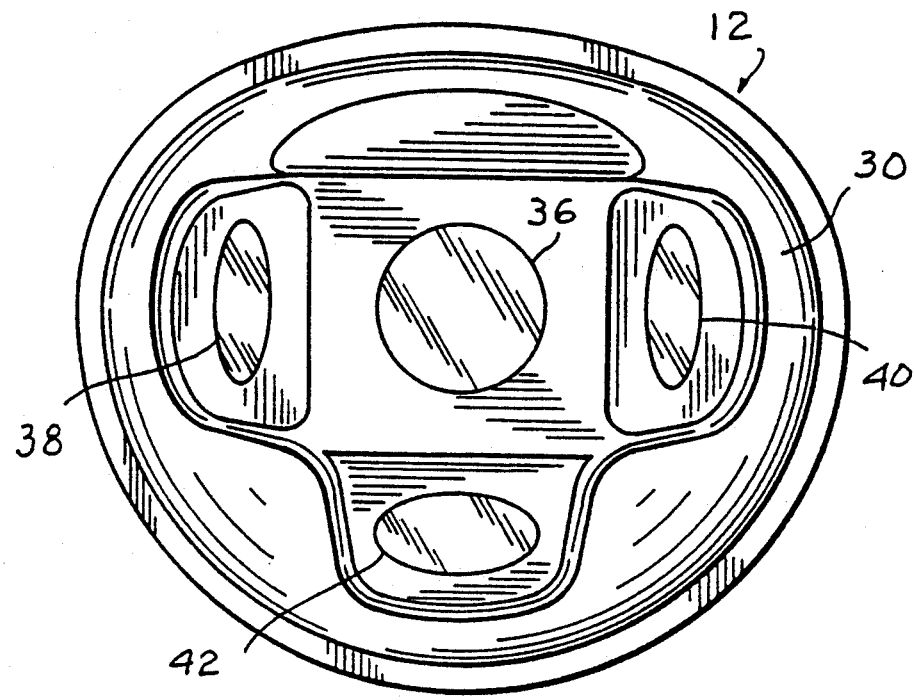
FIG. 4 is a front elevational view thereof.

As illustrated in FIGS. 2-3 and 10, the device 10 is adapted to be installed on a door 16 (illustrated fragmentarily in phantom line) with the axially-extending housing 12 being non-rotatably installed on the door 16. More particularly, door 16 defines an aperture extending therethrough and connecting the front or exterior outer surface 20 and the rear or interior outer surface 22 of the door 16. The "rear" or "interior" and "front" or "exterior" outer surfaces of the door are designated, of course, relative to the person using the viewing device 10. The housing 12 has a front portion 30 adapted to project outwardly from the front or exterior outer surface 20 of the door 16 and a rear portion 32 adapted to extend through the door 16 and projecting outwardly from the opposed rear or interior outer surface 22 of the door 16.

Referring now to FIGS. 2-4 and 6 as well, the housing front portion 30 generally is dome-shaped with a flattened top surface and defines a plurality of surveillance ports 34 including an axial surveillance port 36 disposed along the housing axis, a pair of lateral or side surveillance ports 38, 40 and a downwardly-facing surveillance ports 42. Fixedly disposed within each of the surveillance ports 34 is a lens 44. Preferably the lenses 44 are wide angle lenses affording a viewing field of approximately 58°. Ultrawide angle lenses are not required.

The wide angle lenses 44 are preferably planoconcave—that is, each lens having concave inwardly-facing side and directly opposite therefrom a flat outwardly-facing side. For the purposes of the present invention, the term "wide angle lens" means a lens providing a viewing field extending at least 50° from one side of the field to the other. The lenses may be fashioned from the glass, plastic (e.g., acrylics) or other transparent material. Acrylic lenses are especially preferred, for example, acrylic lenses of approximately 65 diopters having a focal length of about 50 millimeters and a center thickness of about 1.5 millimeters. Naturally, lenses made of different materials will generally employ a different set of specifications—for example, glass lenses of approximately 65 diopters may have a focal length of about 13 to 16 millimeters and a center thickness of about 6 millimeters.

The lenses 44 are positioned in their respective surveillance ports at an acute 20°–40° angle relative to the housing axis, preferably at a 25° angle for the lateral surveillance ports 38, 40 and a 350 angle for the downwardly-facing surveillance port 42 so as to maximize the view of the hall outside the door and minimize the view of the front or exterior outer surface of the door 16. As the lenses 44 in the various surveillance ports 34 are situated to provide views axially, laterally and downwardly relative to the housing axis, all pertinent exterior views are covered. No upwardly-facing view is provided but, on the other hand, it is unlikely that a potential intruder would be situated exclusively about the housing front portion 30, e.g., suspended from the hall ceiling. The lateral and downwardly-facing surveillance ports 38, 40, 42 are disposed in the housing front portion 30 such that, although they are spaced outwardly from the front or exterior outer surface 20 of door 16, the wide angle lenses 44 within the aforementioned surveillance ports 34 have a field of view which precludes concealment of a potential intruder close to the door (either to one side of the housing front portion 30 or therebelow).

The rear portion 32 of the housing 12 is generally cylindrical. The front end thereof, which is disposed forwardly of the front or exterior outer surface 20 of door 16 defines a radially outwardly extending flange, whereas the rear end 52 thereof, which at least partially extends outwardly of the rear or interior outer surface 22 of the door 16, is externally threaded. Preferably, as illustrated, the shaft of the housing rear portion 32, intermediate the front and rear ends thereof, defines a shoulder 54 adapted to mate with a similar shoulder in the aperture extending through the door 16 so as to limit rearward displacement of the housing rear portion 32 relative to the door 16.

A jam nut 56 is screwed onto the threaded back end 52 of the housing rear portion 32 in order to preclude forward motion of the housing rear portion 32. A washer 58 is preferably interposed between the nut 56 and the door rear or interior outer surface 22. As the jam nut 56 and shoulder 54 fix the position of the housing rear portion 32 relative to the door 16, the housing front portion 30 is easily and conveniently installed on the door 16 with at most only minor damage thereto.

A washer-like annular connecting member 60, functionally and structurally a part of the housing 12, connects the front and rear portion 30, 32 thereof. The inner portion of connecting member 60 is disposed behind the rear portion of the flange 50 of the housing rear portion 32 and limits rearward motion thereof relative to the housing front portion 30. The outer portion of connecting member 60 is secured to the housing front portion 30 by three screws 62, the heads of which project rearwardly from the connecting member 60.

The exposed and rearwardly projecting heads of screws 62 may either simply abut against the front or exterior outer surface 20 of door 16 to preclude rotation of the housing front portion 30 relative to the door 16 by frictional engagement there between or recesses (not shown) may be provided in the front or exterior outer surface of the door 16 to receive the heads of the three screws 62 in order to immobilize the housing front portion 30 relative to the door 16 by means of an interference fit between the screw heads and the recesses. In either case, the screws 62 ensure that the housing 12 is non-rotatably mounted on the door 16. If desired, the heads of screws 62 may be countersunk into the connecting member 60 so that they are flush therewith, and rearwardly projecting lugs (not shown) may be provided on the connecting member 60 or the housing front portion 30 and employed (instead of the screw heads) to fix the housing 12 non-rotatably relative to the door 16.

Figure 7:
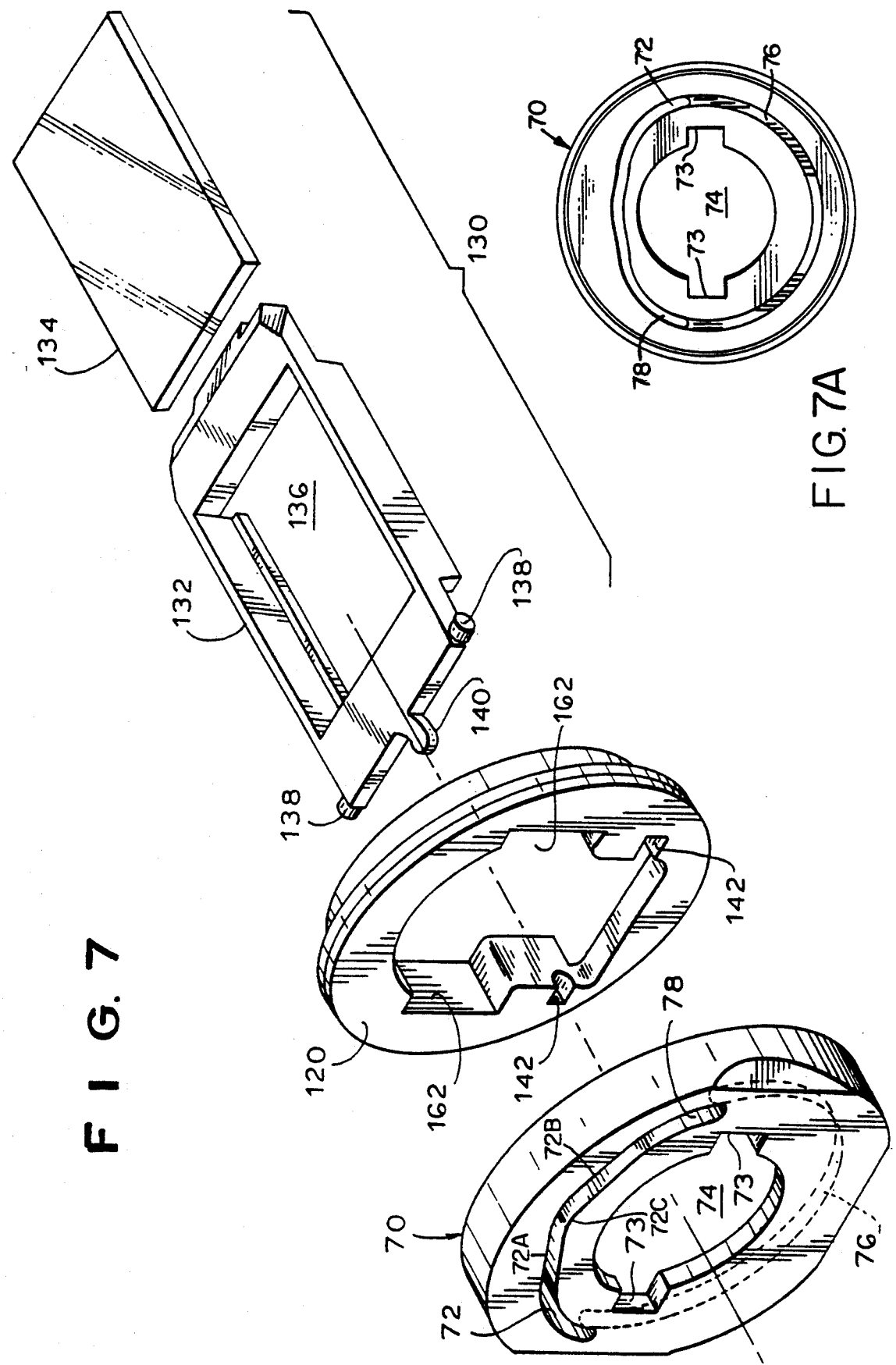
FIG. 7 is an exploded isometric view of the mirror assembly and the cam therefor.

A cam, generally designated 70, is non-rotatably disposed within the interior of the housing front portion 30 and is functionally a part thereof, although preferably structurally separable therefrom. The inner and/or outer peripheries of the cam 70 may be beveled or otherwise contoured to enable it to be non-rotatably disposed relative to the remainder of the housing front portion 30. Indeed, where the material of the housing front portion 30 is suitable and the method of construction thereof permits, the cam 70 may be an integral part of the housing front portion 30. As best seen in FIG. 7, where the cam 70 is not an integral portion of the housing front portion 30, the cam 70 is provided with an outer periphery which is configured and dimensioned to preclude rotation of the cam 70 relative to the housing front portion 30 Alternatively or in addition thereto, the inner periphery of the cam 70 may be adapted to define an interference or abutting fit with portions of the interior surface of the housing front portion 30 for the same purpose, e.g., see slots 73 of the inner periphery which receive lugs (not shown) of the housing front portion 30. For reasons which will become apparent hereinafter, the cam 70 defines a camming surface in the form of a 360° groove 72 extending about a central U aperture 74. The groove 72 is formed of two separate portions: a semicircular groove portion 76 extending 180° about the bottom thereof and a half- or semi-elliptical groove portion 78 extending the other 180° about the top thereof. Whereas the semicircular groove 76 is disposed only on the back surface of the cam 70, the semi-elliptical groove portion 78 is deeper than the groove portion 76 and preferably extends entirely through the cam 70, as illustrated, for reasons which will become apparent hereinafter.

Referring now to FIGS. 2-3, and 10 in particular, a U hollow axially-extending inner tube, generally designated 80, is rotatably disposed relative to the housing 12, typically coaxially with the longitudinal axis of housing 12. The tube 80 defines a front portion 82 disposed at least partially within the housing front portion 30, and a tube rear portion 84 extending at least partially outwardly from the back or interior outer surface 22 of the door 16, the two tube portions 82, 84 together extending axially through the housing rear portion 32 and hence through door 16. The tube rear portion 84 projects rearwardly beyond the housing rear portion 32 so that the knob 14 can be non-rotatably secured thereto, adjacent the rear end 86 thereof, by means of a set screw 88 after the housing 12 has been mounted on the door 16 using the nut 56. The tube front portion 82 and the tube rear portion 84 are secured together at neck 114 for rotation as a unit relative to the housing 12.

The knob 14 defines a viewing port 90 which is axially aligned with the axial surveillance port 36. A glass eyepiece 92 is disposed in the knob 14 intermediate a pair of washers 94. The assembly of the viewing glass 92 and the two washers 94 is held in place within the knob 14, as an eyepiece assembly, by means of a rigid insert 96, and the rear end 86 of the tube rear portion 84. More particularly, the rigid insert 96, preferably formed of steel to further rigidify the knob 14, precludes radial or rearward displacement of the eyepiece assembly, whereas the inner tube rear end 86 precludes forward displacement thereof. While the eyepiece 92 is non-magnifying, there is a magnifying assembly disposed 100, an intermediate non-magnifying lens 102 formed of pyrex of other high-temperature resistant material, and a rear washer 104. The magnifying lens 100 is preferably formed of acrylic or glass and has a strength of 10.4 diopters with a focal length of about 94.8 millimeters. This magnifying assembly is disposed along the length of the tube rear portion 84 and held in position by means of abutment with split tubes 110 and 112 to either side thereof within the tube rear portion 84. The split tube 112 to the rear of the magnifying assembly also assists in maintaining the eyepiece assembly in position by bearing against the washer 94. The front end of the split tube 110 is restrained against forward motion by the neck 114 of reduced diameter at the front end of the inner tube rear portion 84. The jam nut 56, the washer 58, the insert 96, the housing rear portion 32, the tube rear portion 84 and the split tubes 110, 112 are preferably formed of a fire-resistant metal so as to constitute, along with pyrex lens 102, a barrier to the passage of fire through the aperture in door 16. These elements in combination preclude a chimney effect whereby flames would be drawn through the aperture in the door 16 into the room behind the door. Accordingly, except where necessitated by other requirements, the remaining portions of the housing 12 (for example, the housing front portion. 30, the connecting member 60, and the like), the remaining portions of the inner tube 80 (for example, the tube front portion 82) and other elements (such as the knob 14) may be formed of materials which are not particularly fire-resistant, for example, ABS plastic (acrylonitrile-butadine-styrene resin), but preferably combine low cost, easy molding (for example, by injection molding), rigidity, and high strength. The same arrangement further makes the viewing device 10 according to the present invention relatively tamper-proof, as a substantially continuous wall of metal and pyrex blocks the aperture of door 16 even if the remaining portions of the device (such as the plastic housing front portion 30 and plastic tube front portion 82) are broken off by a prospective intruder or burned off during a fire.

The tube front portion 82 is generally U-shaped in configuration for reasons which will become apparent hereinafter. As best seen in FIG. 7, a bearing 120 is disposed intermediate the cam 70 and the front end of the tube front portion 82. The bearing 120 will rotate with the inner tube 80 and may be considered to be both functionally and structurally the front end thereof. The back end of the tube front portion 82 is secured to the front end of the tube rear portion 84 at neck 114 for rotation as a unit.

Referring now to FIGS. 2-3, 7 and 10 in particular, a mirror assembly, generally designated 130, is disposed in the tube front portion 82 for rotation therewith as a unit. The mirror assembly 130 includes a planar and typically rectangular mirror 134 (having an opaque reflecting surface) and a frame 132 defining a central aperture 136 adapted to support and carry the mirror 134 for movement as a unit on minor retainer 136. While a conventional glass mirror 134 requires the presence of a frame 132, clearly a mirror 134 which is of sufficient strength and formable in the configuration of the frame 132 may be utilized by itself in place of the mirror assembly 130.

One end of the frame 132 defines a pair of outwardly projecting hinge pins 138 and, preferably intermediate the hinge pins 138, a cam follower 140. The hinge pins 138 are configured and dimensioned (typically as a cylinder) to be pivotably received within mating recesses 142 on the front surface of the bearing 120 such that the mirror assembly 130 and the bearing 120 are secured together for rotation as a unit. The hinge recesses 142 additionally permit the mirror assembly 130 to pivot about the hinge pins 138 thereof. The mirror assembly 130 is itself configured and dimensioned to be received within the U-shaped tube front portion 82 with the mirror 134 facing the open side thereof. Rotation of the tube 80 forces a corresponding rotation of the mirror assembly 130 and the bearing 120.

The cam follower 140 is preferably in the form of a curved lug or a flattened curved pin and is configured and dimensioned to be received within the groove 72 of the cam 70. As rotation of the knob 14 is transmitted through the set screw 88, via inner tube 80 to mirror assembly 130, the curved cam follower 140 travels along the length of the semicircular groove portion 76 so that the mirror 134 has its reflecting surface (preferably at an acute angle of 20–40° to the tube axis) brought into operative juxtaposition first with one lateral surveillance port 38, 40, then the downward surveillance port 42 and finally the other lateral surveillance port 40, 38. Further rotation of the knob 14 causes further rotation of the mirror assembly 130, with the cam follower 140 now traveling the semi-elliptical portion 78 of the cam groove 72. The curvature of this semi-elliptical groove portion 78 relative to the location of the hinge pins 138 acts on the cam follower 140 so as to cause the mirror assembly 130 to pivot upwardly about the hinge pins 138 and assume an axis parallel to and spaced from the tube axis, thereby permitting a direct line of sight between the viewing port 90 of knob 14 and the axial surveillance port 36 of the housing front portion 30. Similarly, as the curved cam follower 140 leaves the semi-elliptical groove portion 78 and returns to the semicircular groove portion 76, the pressure exerted on the curved cam follower 140 by the groove 72 cause the mirror assembly 130 to return to its initial orientation wherein it is at an acute angle to the inner tube axis. The curved profile of cam follower 140 prevents pull out of the mirror assembly from cam groove 72 and 78.

The semi-elliptical portion groove 78 has a major radius and a minor radius axis which defines three curved sections which are connected to one another with two flat sections 72A and 72B. The resulting structure provides a semi-elliptical groove with an apex 72C. These flat sections allow curved cam follower 140 to be passed smoothly through the semi-elliptical groove portion 78 without binding on the groove. The curved cam follower 140 is curved as shown in FIG. 3 to make it resistant to slipping out of grooves 78, 76 when the minor assembly is rotated.

The mirror 134 is thus movable between a first orientation intersecting the inner tube axis at an acute angle (as illustrated in solid line in both FIGS. 2 and 3 and in phantom line in FIG. 2) and a second orientation parallel to and spaced from the inner tube axis (as illustrated in FIG. 10). Rotation of the knob 14 and hence the inner tube 80 relative to the housing 12 causes both rotation (at all times) and pivoting (at certain times) of the mirror. More particularly, when the mirror 134 is in the first orientation, a line of sight is defined at different times from the viewing port 90 through each of the lateral and downward surveillance ports 38, 40, 42 via the mirror and, when the mirror is in the second orientation, a line of sight is defined from the viewing port 90 directly through the axial surveillance port 36 (since the mirror assembly 130 is in the second orientation illustrated in phantom line in FIG. 2), more completely within the open side of the U-shaped tube front portion 82, spaced from, above, and substantially parallel to the tube axis.

Depending upon the initial orientation of the knob 14 (and hence the mirror assembly 130) and the direction of rotation thereof thereafter, the movement of the mirror to. The second orientation (so as to enable direct axial viewing through the axial surveillance port 36) may occur immediately after viewing through either of the lateral surveillance ports 38, 40. Furthermore, if desired, a different cam groove 72 may be employed in order to vary the sequence of the views available to the viewer through rotation of the knob 14.

In the first orientation, the mirror reflecting surface is preferably inclined at an acute angle of 20°–40° relative to the inner tube axis, identical to the acute angle formed by the wide angle lenses 44 relative to the coincident housing axis, so that the light rays entering the lenses 44 in the lateral and downward surveillance ports 38, 40, 42 are reflected by the mirror 134 back along the tube axis into the viewing port 90 without distortion. Thus the mirror 134 is preferably at a 25° angle for the line of sight through the lateral surveillance ports 38, 40 and a 35° angle for the downwardly-facing surveillance port 42.

As the mirror assembly 130, and in particular the curved cam follower 140 thereof, moves through groove 78 and assumes an orientation more closely parallel to the tube axis (i.e., the second orientation illustrated in FIG. 10), the cam follower 140 will extend further into the groove 72 since it is pivoting about hinge pins 138, which are a fixed distance from the cam 70. Accordingly, where the depth of the groove portion 76 is substantially fully occupied by the cam follower 140, the groove portion 78 must either be deeper or, as illustrated, pass through the cam 70 in its entirety. While the camming surface has been illustrated as a groove 72, clearly not all surfaces of the groove 72 are required to effect the desired guidance of the cam follower 140, and, accordingly, only the portions thereof functioning as a camming surface are actually required according to the present invention.

Figure 8:
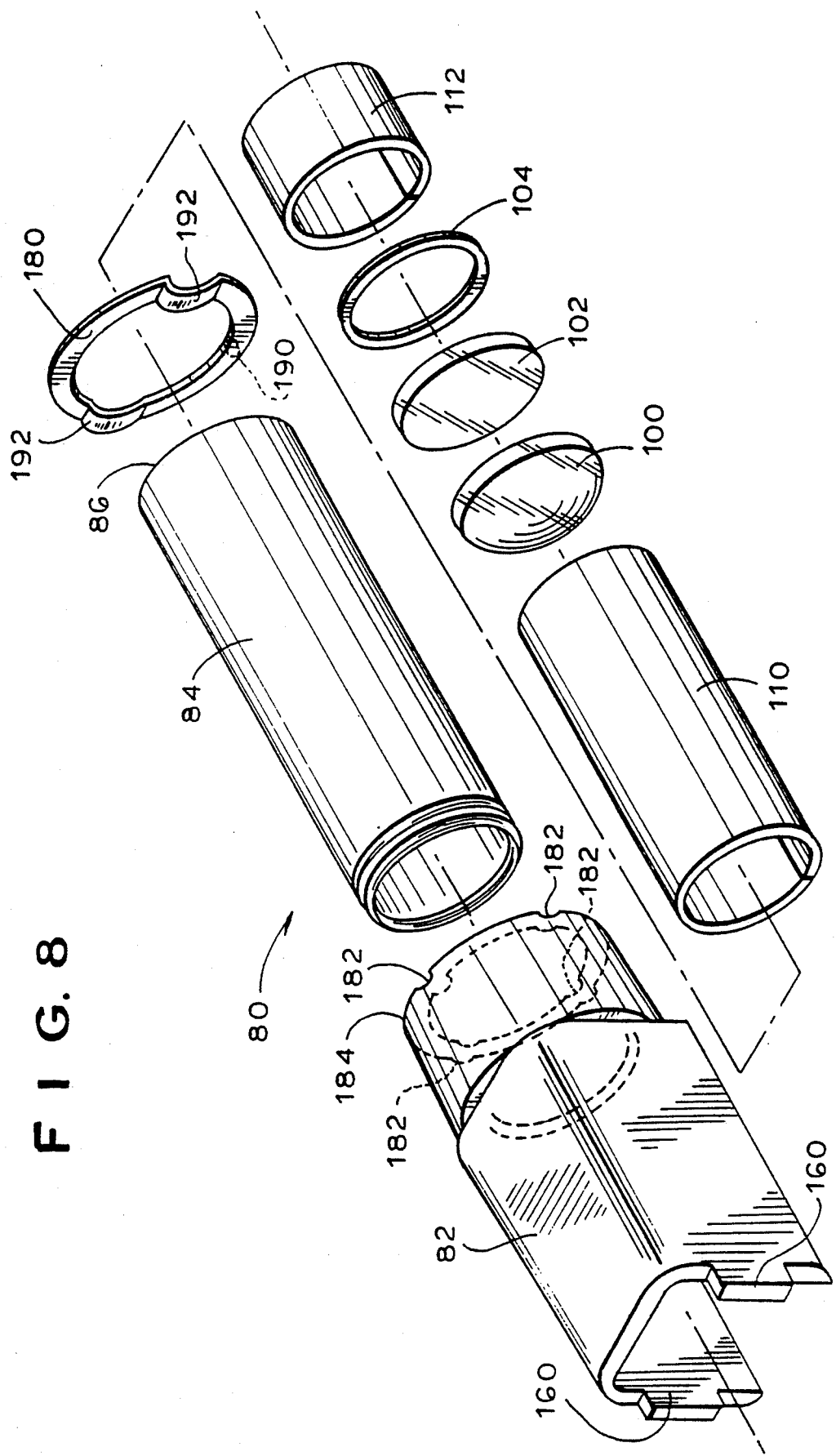
FIG. 8 is an exploded isometric view of the inner tube.
Figure 9:
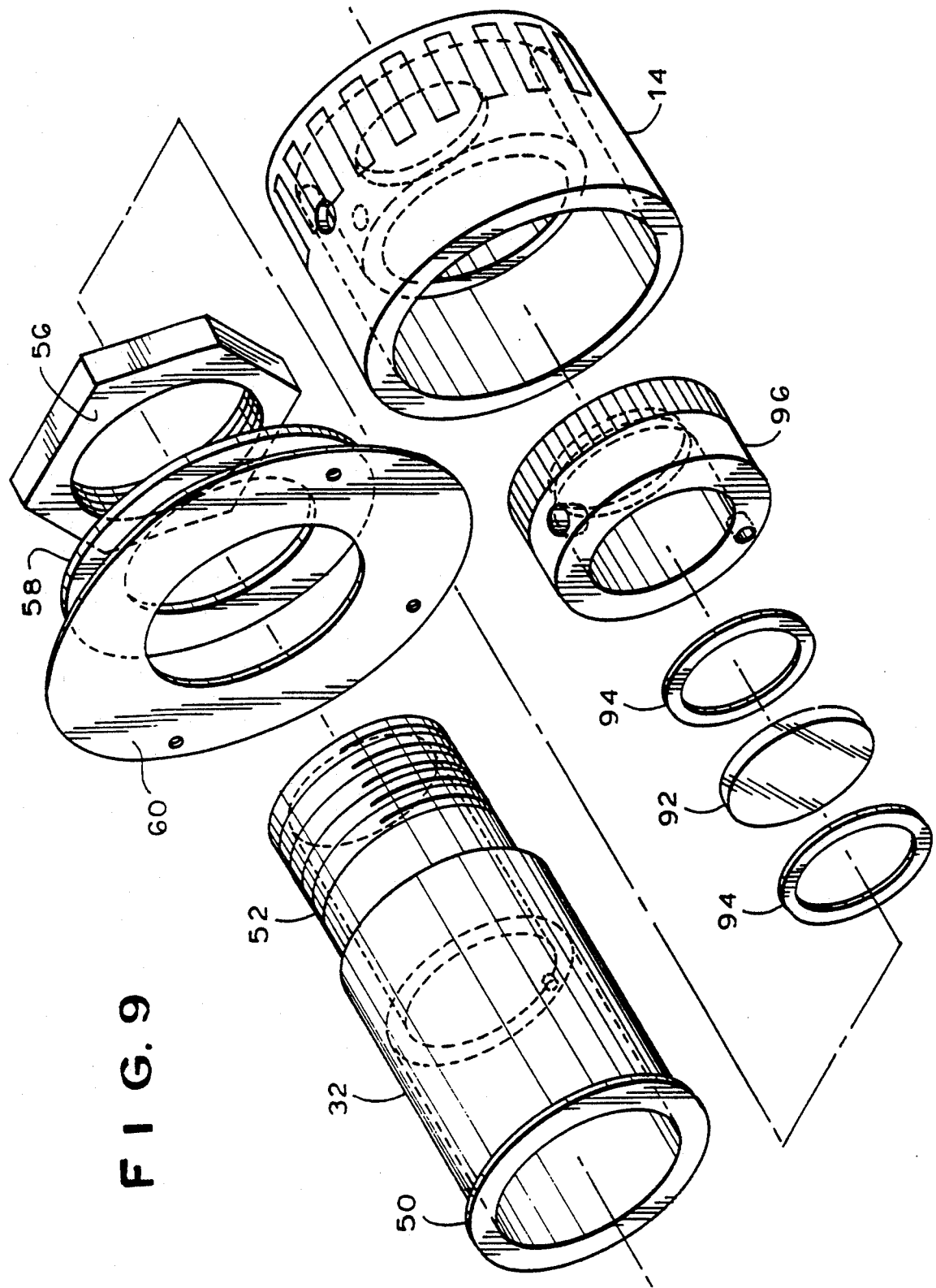
FIG. 9 is an exploded isometric view of the knob and a portion of the housing.

The torque created by the rotation of knob 14 may be directly applied via tube 80 to the sides of the mirror assembly 130 to force the rotation thereof, and of the bearing 120. This arrangement can, however, result in damage to the frame 132 with repeated use. Accordingly, as best illustrated in FIGS. 7 and 8, the front end of tube front portion 82 defines a diametrically opposed pair of lugs 160, and the bearing 120 defines a diametrically opposed pair of recesses 162 adapted to receive the lugs 160, so that rotation of the knob 14 is communicated via the tube 80 directly to the bearing 120, with the rotation of bearing 120 resulting in rotation of the mirror assembly 130 as a result of the engagement of hinge pins 138 and the recesses 142 therefor. As a result, there is less tendency for the mirror to be knocked out of its desired central location with repeated use, and there is an enhanced mirror stability (i.e., less mirror shuddering).

Figure 5:
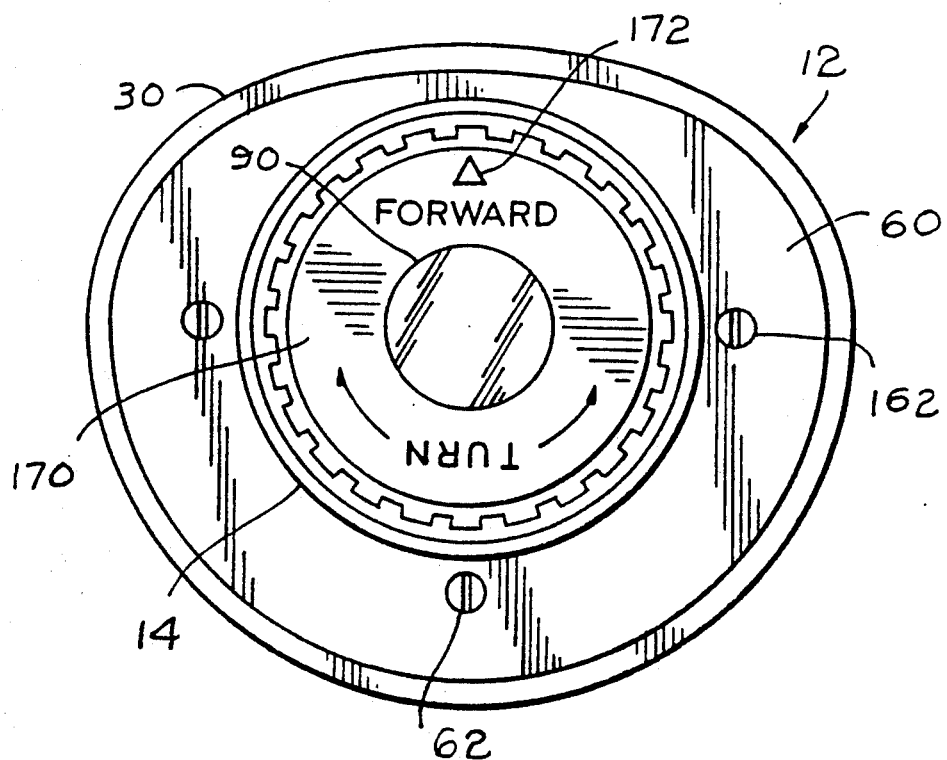
FIG. 5 is a rear elevational view thereof.
Figure 6:
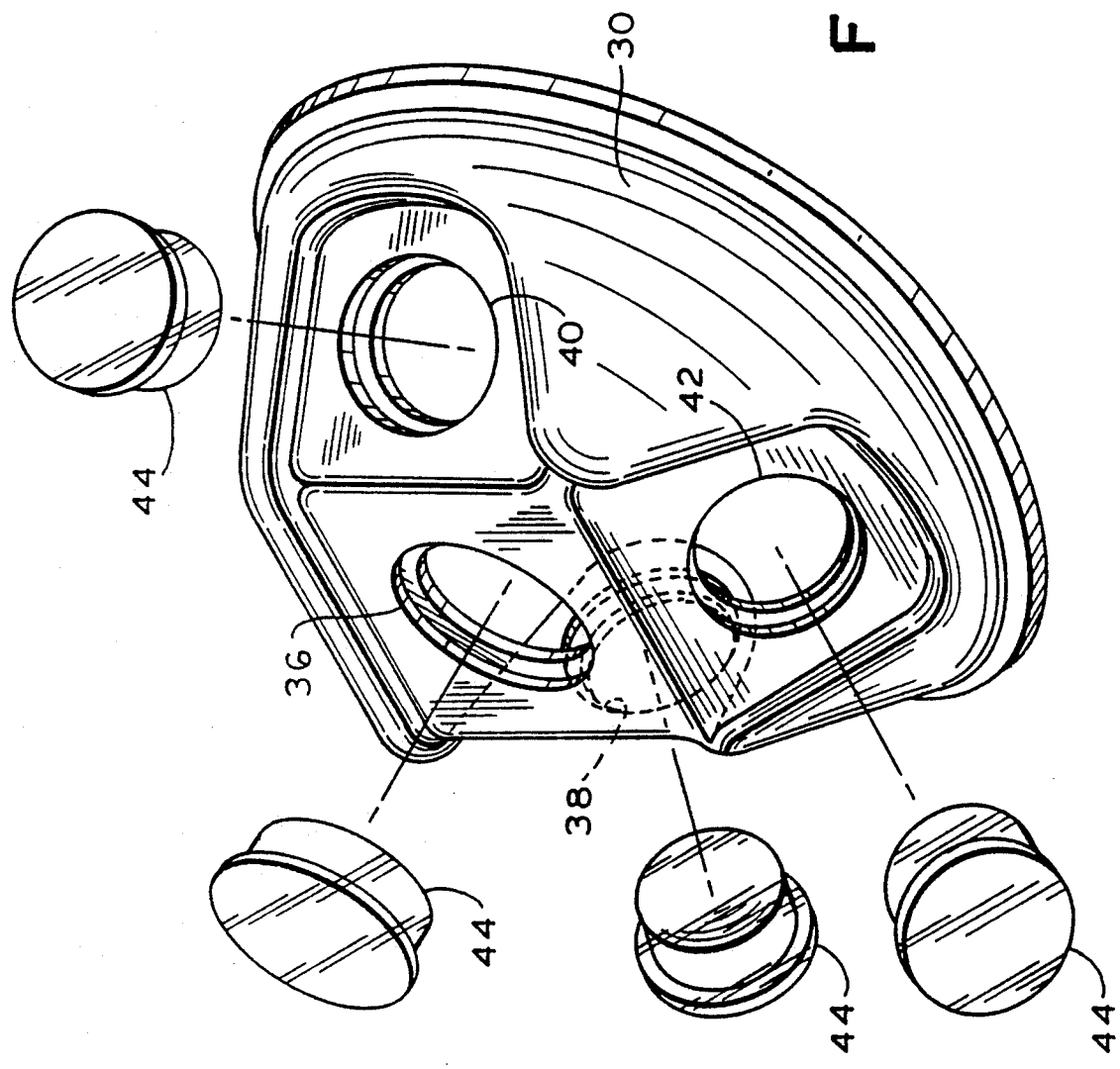
FIG. 6 is an exploded isometric view of the housing front portion.

As illustrated in FIG. 5, the rear surface 170 of knob 14 may be provided with a legend indicating, as by an arrow, the position of the knob which permits direct axial viewing from the viewing port 90 through the axial surveillance port 36. (For example, using the legend "FORWARD" in connection with an arrowhead 172.) However, as earlier noted, the provision of such indicia is of only limited utility to the viewer whose eye is pressed against the viewing port 90. Even when the indicia, and especially the arrowhead 172, is raised and-/or when a side of the knob is flattened so that they may be tactilely detected by the person using the viewer, it is often difficult for the person to be certain when the knob has been rotated to an appropriate position for enabling viewing through one or another of the surveillance ports 36–42.

Accordingly, referring now in particular to FIGS. 2-3, 8 and 10, in a preferred embodiment of the present invention, means are provided for non-visually indicating when the rotation of the knob 14 has resulted in the mirror assembly 130 being rotated or pivoted such that a line of sight has been established between the viewing port 90 and one of the surveillance ports 36–42 (either directly or via the mirror 134). The means comprises a wave washer 180 non-rotatably mounted on the housing rear portion 32 and a plurality of counter-waves or indentations 182 formed on the back surface 184 of the tube front portion 82. The wave washer 180 is fixed by a pin 190 at a single point to the housing rear portion 32, with the remaining portion of the washer 180 being free to expand outwardly somewhat as the wave 192 of the washer is depressed by a non-indented portion of the tube rear surface 184.

As illustrated, the wave washer 180 has a single wave 192 extending across the annulus thereof, while the tube rear surface 184 has a pair of indentations 182 extending across the annulus thereof at right angles to each other. Clearly, alternative arrangements may be utilized, including one wherein the wave washer 180 defines a pair of waves 192 disposed at right angles to one another and the tube rear surface 184 defines only a single wave 182. In either case, as the knob 14 and thus tube front portion 82 is rotated relative to the housing rear portion 32, so that the mirror 134 assumes an appropriate orientation enabling a line of sight between the viewing port 90 and one of the surveillance ports 36–42 (either via the mirror or directly), the engagement of the wave(s) 192 with the indentation(s) 182 is easily detectable by the viewer because an audible "snap" sound and/or tactile sensation is created as the wave 192 seats in an indentation 182.

An additional function of the wave washer 180 is to apply a forward pressure constantly on the inner tube 80 and bearing 120, thereby to bias the bearing 120 against the cam 70 and lock the hinge pins 138 of mirror assembly 130 therebetween and the cam follower 140 in camming groove 72.

To install the device 10 in the door 16, an aperture of suitable configuration and dimensions to receive the housing rear portion 32 is drilled into the door, preferably with an inwardly extending shoulder adapted to receive the shoulder 54. Recesses may also be drilled into the front or exterior outer surface 20 of the door 16 to receive the heads of screws 62. The device 10, except the knob 14, jam nut 56 and washer 58, is then mounted on the door from the front thereof (with the heads of screws 62 disposed in any recesses provided therefor and the shoulder 54 abutting against any shoulder provided therefor in the aperture) so that the threaded rear end 52 of the housing 12 projects from the rear or interior outer surface 22 of the door 16. The washer 58 is then installed, and jam nut 56 applied to the threaded end 52. Thereafter, the knob 14 is applied over the threaded end 52 and nut 56 and secured to the tube end 86 by tightening of set screws 88. The device 10 is then ready for use.

To use the device 10, a person has only to look through the viewing port 90 and rotate the knob 14 through a 360° angle (actually, a 270° angle will normally suffice) to obtain lines of sight from the viewing port 90 through each of the surveillance ports 36–42, stopping as each snap is heard or felt to inspect the view presented at that instant. If no view is then available, the person may assume either that there is no light for illumination purposes outside the door or the surveillance ports have been intentionally covered, perhaps by a prospective intruder.

To summarize, the present invention provides a viewing device affording a high level of viewing acuity along all pertinent lines of sight, with all pertinent lines of sight affording generally equally viewing acuity. The viewing device acts as a fire barrier and is characterized by a high level of reliability and a high resistance to tampering. It is simple and easy to manufacture, use and maintain. In a preferred embodiment, the device communicates in a non-visual manner with the viewer to indicate when one of the possible lines of sight has been achieved.

Now that the preferred embodiments of the present U invention have been shown and described in detail, various modifications and improvements thereon will become readily apparent to those skilled in the art. Accordingly, the spirit and scope of the present invention is to be limited only by the appended claims, and not by the foregoing specification.

I claim:

1. A viewing device comprising:
   (a) a hollow axially-extending housing for non-rotatable installation through a surface of a wall or door, said housing having a front portion adapted to project outwardly from the front of said surface and a rear portion extending through said surface and projecting outwardly from the opposed rear surface of said wall or door; said front portion defining a camming surface and a plurality of surveillance ports disposed axially and non-axially relative to the axis of said housing having;
   (B) a hollow axially-extending inner tube rotatable relative to said housing and defining a front portion and a rear portion, said tube front portion being disposed at least partially within said housing front portion, and said tube rear portion projecting outwardly from said opposed rear surface;
   (C) a hollow rotatable knob adapted to extend outwardly from the opposed rear surface and releasably secured to said tube rear portion for rotation therewith, said knob defining a viewing port axially aligned with said axial surveillance port; and
   (D) a mirror assembly disposed in said inner tube for rotation therewith and including a mirror movable between a first orientation intersecting said inner tube axis at an acute angle and a second orientation parallel to and spaced from said inner tube axis, said mirror assembly defining a curved cam follower cooperatively engaging a camming surface such that rotation of said knob relative to said housing causes rotation and pivoting of said mirror so that, when said mirror is in said first orientation, a line of sight is defined at different times from said viewing port through each of said non-axial surveillance ports via said mirror and, when said mirror is in said second orientation, a line of sight is defined from said viewing port directly through said axial surveillance port wherein said camming surface defines a 360° groove which is semicircular about 180° and semi-elliptical for about 180°.

2. The device of claim 1 wherein rotation of said knob causes rotation of said mirror to define at different times lines of sight from said viewing port successively via said mirror through each of said non-axial surveillance ports.

3. The device of claim 2 wherein rotation of said knob at one point causes pivoting of said mirror out of the line of sight from said viewing port directly through said axial surveillance port.

4. The device of claim 1 wherein said tube front end portion is generally U-shaped and defines an open side to enable a line of sight from said viewing port via said mirror through one of said non-axial surveillance ports.

5. The device of claim 4 wherein said mirror is pivotable upwardly toward said open side of said tube front portion to enable a line of sight from said viewing port directly through said axial surveillance port.

6. The device of claim 1 wherein said camming surface defines a 360° groove.

7. The device of claim 6 wherein said camming surface defines a 360° groove which is semicircular about 180° and semi-elliptical for about 180°.

8. The device of claim 7 wherein the semi-eliptical groove portion has curved sections which are connected with flattened sections.

9. The device of claim 7, wherein the semi-eliptical groove has a major radius and a minor radius which define three curved section, said three curved sections being connected together with two flat sections.

10. The device of claim 1 wherein said mirror has an opaque reflecting surface.

11. The device of claim 1 wherein said housing and said inner tube define snap-action means for indicating to the user the effecting of a line of sight between said viewing port and one of said surveillance ports.

12. The device of claim 11 wherein said housing and said inner tube define snap-action means for indicating to the user the effecting of a line of sight between said viewing port and each of said surveillance ports.

13. The device according to claim 12 wherein a wave washer defining at least one wave is secured to said housing, and said inner tube defines a plurality of circumferentially spaced indentations adapted to receive said wave of said wave washer when a line of sight is effected from said viewing port through one of said surveillance ports.

14. The device of claim 13 wherein said wave washer is non-rotatably secured to said housing rear portion, and said plurality of circumferentially spaced indentations are equidistantly spaced apart.

15. The device of claim 11 wherein said snap-action means also biases said cam follower against said camming surface.

16. The device of claim 1 additionally including means for biasing said curved cam follower against said camming surface.

17. The device of claim 1 wherein said housing rear portion is made of metal, said inner tube rear portion is made of metal, and a lens made of pyrex is disposed within said tube rear portion, whereby said housing rear portion, tube rear portion and pyrex lens define a fire barrier within said device.

18. The device of claim 1 wherein said housing and tube rear portions are metal, and said housing and tube front portions are plastic.

19. The device of claim 1 wherein a wide angle lens is disposed in each of said surveillance ports.

20. The device of claim 1 wherein a magnifying lens is disposed in said inner tube in the lines of sight between said viewing port and said surveillance ports.

21. A viewing device for installation on a door, comprising:
(A) a hollow axially-extending housing for non-rotatable installation through a door, said housing having a front portion projecting outwardly from a front surface of the door and a rear portion made of metal extending through the door and projecting outwardly from an opposed rear surface of the door; said front portion defining a camming surface and a plurality of surveillance ports disposed axially, and non-axially to the axis of said housing, said camming surface in turn defining a 360° groove which is semicircular for about 180° and semi-elliptical for about 180°;
(B) a hollow axially-extending inner tube rotatable relative to said housing and defining a front portion and a rear portion, said tube front portion being made of plastic and disposed at least partially within said housing front portion, and said tube rear portion being made of metal and projecting outwardly from the door rear surface;
(C) a hollow rotatable knob extending outwardly from the door rear surface and releasably secured to said tube rear portion for rotation therewith, said knob defining a viewing port axially aligned with said axial surveillance port;
(D) a mirror assembly disposed in said inner tube for rotation therewith adjacent said housing front portion and including a mirror movable between a first orientation intersecting said inner tube axis at an acute angle and a second orientation parallel to and spaced from said inner tube axis, said mirror assembly defining a curved cam follower cooperatively engaging said camming surface such that rotation of said knob relative to said housing causes rotation and pivoting of said mirror so that, when said mirror is in said first orientation, a line of sight is defined at different times from said viewing port through each of said non-axial surveillance ports via said mirror and, when said mirror is in said second orientation, a line of sight is defined from said viewing port directly through said axial surveillance port, said mirror having an opaque reflecting surface and being disposed an angle of about 20–40° relative to the longitudinal axis of said inner tube when disposed in the line of sight from said viewing port through one of said lateral and downward surveillance ports;
(E) a lens made of pyrex disposed within said tube rear end portion, whereby said housing rear portion, said tube rear end portion, and said pyrex lens define a fire barrier within said device;
(F) a wide angle lens disposed in each of said surveillance ports; and
(G) a magnifying lens disposed in said inner tube in the lines of sight between said viewing port and said surveillance ports;
whereby rotation of said knob causes rotation of said mirror to define at different times lines of sight from said viewing port successively via said mirror through each of said lateral and downward surveillance ports, and rotation of said knob at one point causes pivoting of said mirror out of the line of sight from said viewing port directly through said axial surveillance port.

22. The device of claim 21 wherein said housing and said inner tube define snap-action means for indicating to the user the effecting of a line of sight between said viewing port and each of said surveillance ports, said snap-action means including a wave washer non-rotatably secured to said housing rear portion defining at least one wave and a plurality of circumferentially spaced indentations on said inner tube adapted to receive said wave of said wave washer when each line of sight is effected from said viewing port through one of said surveillance ports.

23. The device of claim 21 wherein said front end portion of said inner tube is generally U-shaped and defines an open side to enable a line of sight from said viewing port via said mirror through one of said non-axial surveillance ports, and said mirror is pivotable upwardly toward said open side of said U-shaped front end portion of said inner tube to enable a line of sight from said viewing port directly through said axial surveillance port.

* * * * *